(12) United States Patent
Coffman

(10) Patent No.: US 6,824,169 B2
(45) Date of Patent: Nov. 30, 2004

(54) HOSE AND CLAMP ASSEMBLY, CLAMP SUBASSEMBLY AND METHOD

(75) Inventor: Willett Coffman, Lexington, TN (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/294,412

(22) Filed: Nov. 14, 2002

(65) Prior Publication Data
US 2004/0094962 A1 May 20, 2004

(51) Int. Cl.[7] .............................................. F16L 33/00
(52) U.S. Cl. ........................ 285/23; 285/252; 285/253; 29/890.14
(58) Field of Search ..................... 285/23, 253, 252, 285/242; 29/890.14

(56) References Cited

U.S. PATENT DOCUMENTS

| 3,365,218 A | * | 1/1968 | Denyes ........................ 285/253 |
| 3,407,448 A | * | 10/1968 | Tetzlaff et al. .............. 285/253 |
| 3,477,106 A | * | 11/1969 | Tetzlaff et al. .............. 285/253 |
| 5,002,094 A | | 3/1991 | Brovont |
| 5,145,218 A | | 9/1992 | Worley et al. |
| 5,185,913 A | | 2/1993 | Campo et al. |
| 5,234,233 A | | 8/1993 | Fix |
| 5,388,321 A | | 2/1995 | Farrell |
| 6,343,772 B1 | * | 2/2002 | Oi ............................... 285/252 |

* cited by examiner

*Primary Examiner*—David Bochna
(74) *Attorney, Agent, or Firm*—Joseph V. Tassone; Thompson Hine LLP

(57) ABSTRACT

A clamp subassembly includes an annular clamp and a clip attached to the clamp. A hose and clamp assembly includes a hose having an outer surface and an opposing sealing surface and includes the clamp subassembly. The clamp surrounds the hose and has an inner surface with an adjustable diameter. The clip includes a tang having a free end embedded in the hose providing attachment of the clamp subassembly to the hose, wherein no portion of the clamp and no portion of the clip interferes with the sealing surface of the hose. A method for attaching an annular clamp to a hose includes attaching a clip to the clamp, wherein the clip includes a tang having a free end. The clamp is disposed to surround the hose. The free end of the tang is embedded in the hose. In a different embodiment, for the assembly and the subassembly, the clamp and the tang together define a monolithic structure.

7 Claims, 3 Drawing Sheets

US 6,824,169 B2

HOSE AND CLAMP ASSEMBLY, CLAMP SUBASSEMBLY AND METHOD

TECHNICAL FIELD

The present invention relates generally to clamps, and more particularly to clamps for hoses.

BACKGROUND OF THE INVENTION

The automotive industry utilizes numerous hoses (or tubes) in their constructions. Many of the hoses used in the industry are connected to the vehicle by means of a clamp (hose clamp, constant tension clamp, etc.) Numerous manufacturers have requested that hoses be provided with attached clamps in order to assist in assembly. The attached clamps assist by reducing the amount of time to connect the hoses to the vehicle.

Clamps are currently attached to hoses by several known methods. The most common methods utilize some form of superglue to attach the clamp or a fixture housing the clamp. A common problem with these attached clamps is that the clamp becomes detached from the hose during shipment or unpacking.

Another known method for attachment of clamps to hoses utilizes a clip that is mechanically attached to the hose. The clip, which is spot welded to the clamp, runs axially with the hose and wraps around the end of the hose. This clip is then closed onto the wall of the hose in order to be held in place. This puts the clip in contact with the sealing surface of the hose. This interference of the clip with the hose sealing surface increases the possibility of leakage when the clamp is tightened to connect the hose to the vehicle.

What is needed is an improved hose and clamp assembly, an improved clamp subassembly, and an improved method for attaching an annular clamp to a hose.

SUMMARY OF THE INVENTION

A first expression of an embodiment of the invention is for a hose and clamp assembly having a hose and having a clamp subassembly. The hose has an outer surface and an opposing sealing surface. The clamp subassembly includes an annular clamp and includes a clip attached to the clamp. The clamp surrounds the hose and has an inner surface with an adjustable diameter. The clip includes a tang having a free end embedded in the hose providing attachment of the clamp to the hose. No portion of the clamp and no portion of the clip interferes with the sealing surface of the hose.

A second expression of an embodiment of the invention is for a clamp subassembly including an annular clamp and including a clip attached to the clamp. The clamp is positionable to surround a hose having an outer surface and an opposing sealing surface. The clamp has an inner surface with an adjustable diameter. The clip includes a tang. The tang has a free end which is embeddable in the hose to provide attachment of the clamp to the hose with no portion of the clamp and no portion of the clip interfering with the sealing surface of the hose.

A method of the invention is for attaching an annular clamp to a hose. The clamp has an inner surface with an adjustable diameter. The hose has an outer surface and an opposing sealing surface. The method includes steps a) through c). Step a) includes attaching a clip to the clamp, wherein the clip includes a tang having a free end. Step b) includes positioning the clamp to surround the hose. Step c) includes embedding the free end of the tang in the hose with no portion of the clamp and no portion of the clip interfering with the sealing surface of the hose.

One expression of a second embodiment of the invention is for a hose and clamp assembly having a hose, an annular clamp, and a tang. The hose has an outer surface and an opposing sealing surface. The clamp and the tang together define a monolithic structure, wherein the clamp surrounds the hose and has an inner surface with an adjustable diameter, wherein the tang has a free end embedded in the hose providing attachment of the clamp to the hose, and wherein no portion of the clamp and no portion of the tang interferes with the sealing surface of the hose.

Another expression of a second embodiment of the invention is for a clamp subassembly including an annular clamp and a tang together defining a monolithic structure, wherein the clamp is disposable to surround a hose having an outer surface and an opposing sealing surface, wherein the clamp has an inner surface with an adjustable diameter, and wherein the tang has a free end which is embeddable in the hose to provide attachment of the clamp to the hose with no portion of the clamp and no portion the tang interfering with the sealing surface of the hose.

Several benefits and advantages are derived from one or more of the expressions of the disclosed embodiments and/or the method of the invention. Attaching the clamp to the hose by embedding the free end of the tang in the hose provides a mechanical attachment of the clamp to the hose which is more robust than prior art glued-on clamp-to-hose attachments. By having no portion of the clamp and no portion of the clip (or no portion of just the tang in the embodiment without the clip) interfere with the sealing surface of the hose, prior art leakage problems of a clamp or a clip contacting the sealing surface of the hose are avoided.

SUMMARY OF THE DRAWINGS

FIGS. 4–7 are end views of the hose and the clamp subassembly of FIG. 1 together with an embodiment of an assembly tool showing, in stages, a method for attaching the clamp to the hose for which FIG. 1 is the end result;

DESCRIPTION OF THE PREFERRED EMBODIMENTS

Figure 1:
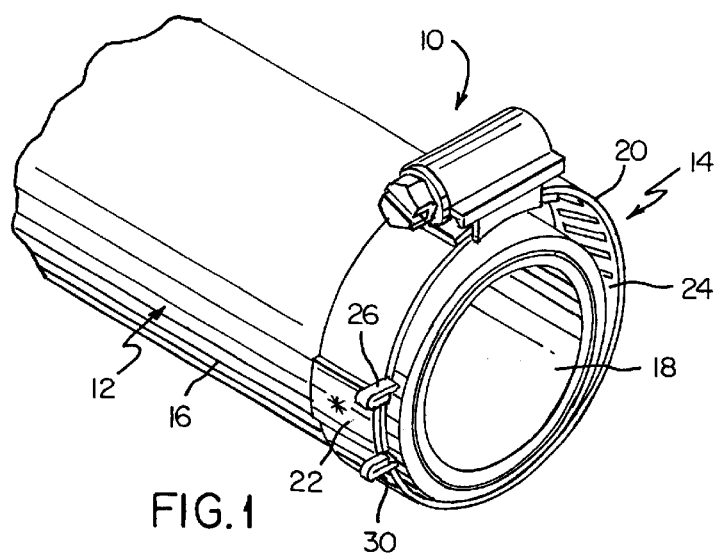
FIG. 1 is a perspective view of an embodiment of the hose and clamp assembly, including the clamp subassembly, of the invention.
Figure 2:
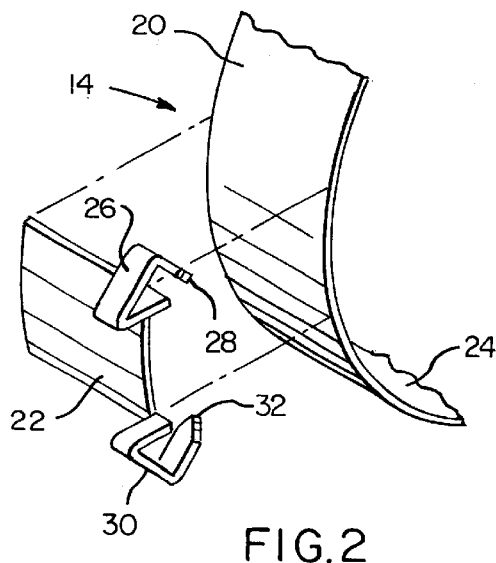
FIG. 2 is an enlarged exploded view of a portion of the clamp subassembly of FIG. 1 showing the clip detached from the clamp before attachment thereto.
Figure 3:
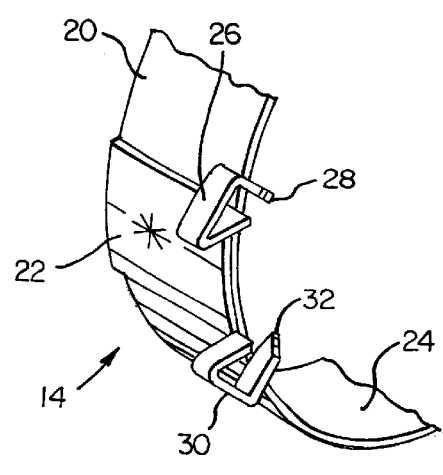
FIG. 3 is a view, as in FIG. 2, but with the clip attached to the clamp.
Figure 4:
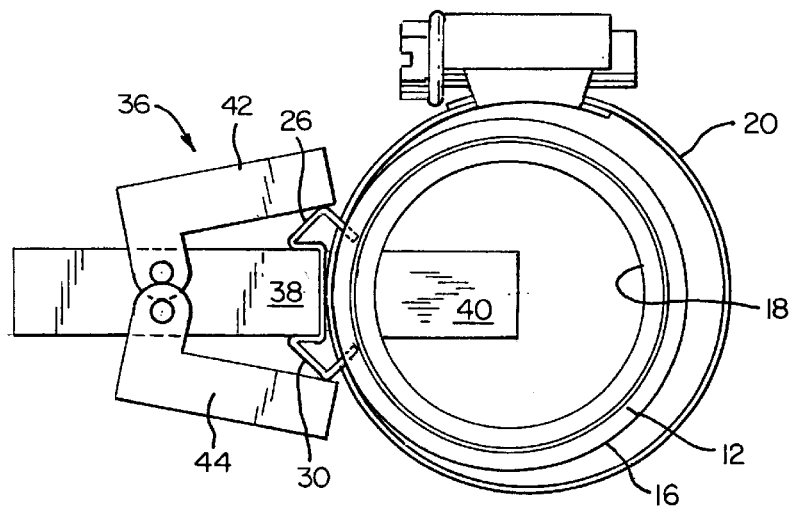
Figure 5:
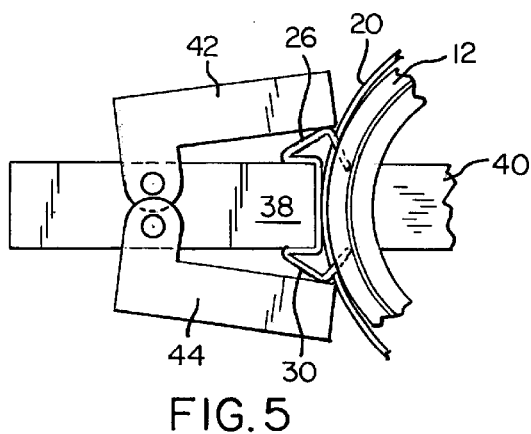
Figure 6:
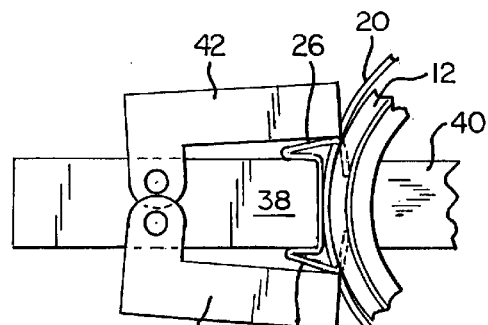
Figure 7:
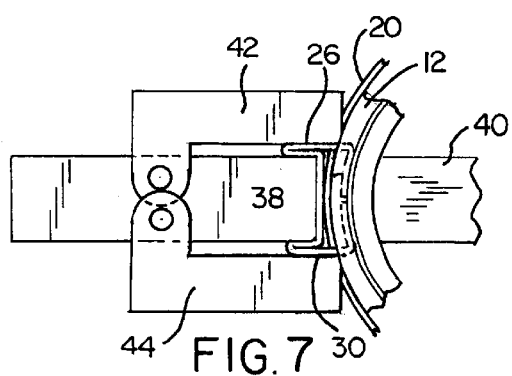

Referring now to the drawings, FIGS. 1–3 illustrate an embodiment of the present invention. A first expression of the embodiment shown in FIGS. 1–3 is for a hose and clamp assembly 10 including a hose (or tube) 12 and a clamp subassembly 14. The hose has an outer surface 16 and an opposing sealing surface 18. The clamp subassembly 14 includes an annular clamp 20 and includes a clip 22 attached to the clamp 20. The clamp 20 surrounds the hose 12 and has an inner surface 24 with an adjustable diameter. The clip 22 includes a tang 26 having a free end 28 embedded in the hose 12 providing attachment of the clamp subassembly 14 to the hose 12, wherein no portion of the clamp 20 and no portion of the clip 22 interferes with the sealing surface 18 of the hose 12. The term "interferes" includes, without limitation, "contacts", and the term "hose" includes, without limitation, "tube".

In one example, the clamp 20 is a hose clamp as shown in FIG. 1, and the free end 28 of the tang 26 of the clip 22 has a barbed point. Other examples of the clamp 20 and the clip 22 are left to the artisan.

In one design, the free end 28 of the tang 26 is embedded in the outer surface 16 only of the hose 12. In other designs, not shown, the free end of the tang is only, or is also, embedded in the annular end of the hose. In one modification, the clip 22 also includes an additional tang 30 having an additional free end 32 embedded in the outer surface 16 only of the hose 12. In one variation, the free end 28 and the additional free end 32 generally face each other. In one enablement, the free end 28 and the additional free end 32 are circumferentially spaced apart. The number and configuration of the tangs is left to the artisan.

In one construction, the free end 28 and the additional free end 32 are crimped into the outer surface 16 of the hose 12. In the same or a different construction, the clip 22 is spot welded to the clamp 20. In one choice of materials, the clamp 20 (e.g., a hose clamp) and the clip 22 comprise metal, and the hose 12 comprises an elastomer (such as rubber).

A second expression of the embodiment shown in FIGS. 1–3 is for a clamp subassembly 14 including an annular clamp 20 and including a clip 22 attached to the clamp 20. The clamp 20 is disposable to surround a hose 12 having an outer surface 16 and an opposing sealing surface 18. The clamp 20 has an inner surface 24 with an adjustable diameter, and the clip 22 includes a tang 26 having a free end 28 which is embeddable in the hose 12 to provide attachment of the clamp 20 to the hose 12 with no portion of the clamp 20 and no portion of the clip 22 interfering with the sealing surface 18 of the hose 12.

The various examples, designs, etc. previously described for the first expression are equally applicable to the second expression of the embodiment shown in FIGS. 1–3.

A method of the invention is for attaching an annular clamp 20 to a hose 12, wherein the clamp 20 has an inner surface 24 with an adjustable diameter, and wherein the hose 12 has an outer surface 16 and an opposing sealing surface 18. The method includes steps a) through c). Step a) includes attaching a clip 22 to the clamp 20, wherein the clip 22 includes a tang 26 having a free end 28. Step b) includes disposing the clamp 20 to surround the hose 12. Step c) includes embedding the free end 28 of the tang 26 in the hose 12 with no portion of the clamp 20 and no portion of the clip 22 interfering with the sealing surface 18 of the hose 12.

The various examples, designs, etc. previously described for the first expression of the embodiment shown in FIGS. 1–3 are equally applicable to the method of the invention. In one procedure, step c) embeds the free end 28 of the tang 26 into the outer surface 16 only of the hose 12. In one execution, step c) crimps the free end 28 of the tang 26 into the outer surface 16 of the hose 12.

FIGS. 4–7 illustrate the hose and the clamp subassembly of FIG. 1 together with an embodiment of an assembly tool 36 showing, in stages, one technique for crimping the free end 28 of the tang 26 and the additional free end 32 of the additional tang 30 into the outer surface 16 of the hose 12.

In this technique, the clip 22 is stamped, shaped and positioned as shown in FIG. 2. The clip 22 is then spot welded (or otherwise attached) to the clamp 20 as shown in FIG. 3 creating the clamp subassembly 14. The clamp subassembly 14 is then attached to the hose 12 via numerous mechanical processes such as the technique illustrated in FIGS. 4–7. The tool 36 includes a first anvil piece 38, a second anvil piece 40, a first crimping jaw 42, and a second crimping jaw 44. The anvils 38 and 40 are intended to maintain the proper relationship between the hose 12 and the clamp subassembly 14 prior to crimping. The anvils 38 and 40 are also intended to provide mechanical stability during the crimping process. The double crimping jaws 42 and 44 provide a force to the free end 28 of the tang 26 and to the additional free end 32 of the additional tang 30 of the clip 22. This force will then cause the free end 28 and the additional free end 32 to enter the hose wall at a controlled angle, thus limiting the depth of penetration. The double crimping jaws will continue to provide force until the clip is closed and comes to rest against the anvils. This minimizes clip distortion and ensures crimp repeatability.

Figure 9:
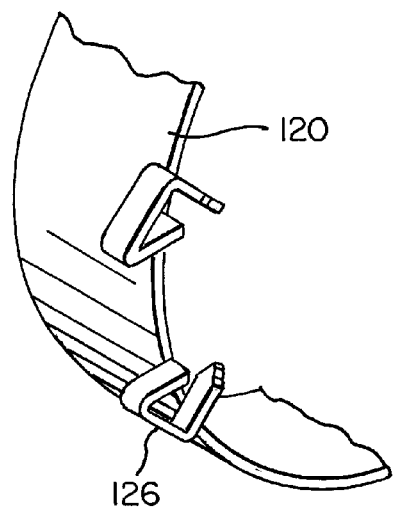
FIG. 9 is a perspective view of an additional embodiment of the tang and the clamp of FIGS. 1–7, wherein the tang and the clamp together define a monolithic structure.
Figure 8:
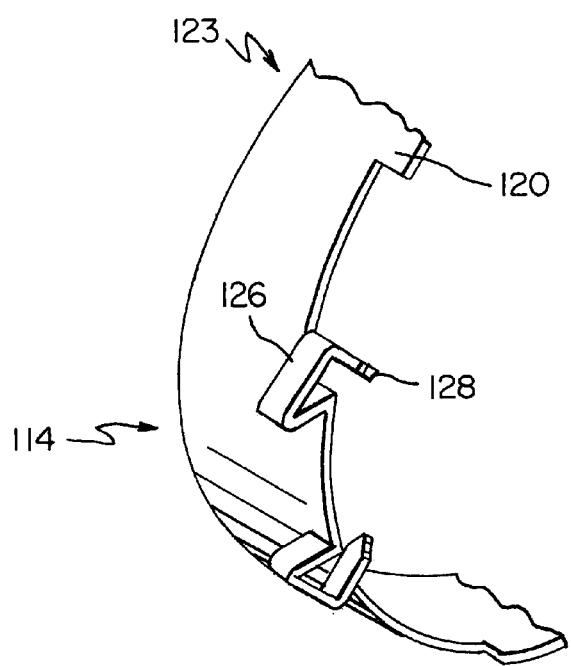
FIG. 8 is a perspective view of another embodiment of the tang and the clamp of FIGS. 1–7, wherein the tang and the clamp together define a monolithic structure.

A second embodiment of the invention employs a different annular clamp 120 and a different tang 126 as shown in FIG. 8. In one expression of the second embodiment, a hose and clamp assembly (which may be visualized by substituting the clamp 120 and tang 126 of FIG. 8 for the clamp 20 and clip 22 of FIGS. 1–7) includes a hose, an annular clamp 120, and a tang 126. The hose has an outer surface and an opposing sealing surface. The clamp 120 and the tang 126 together define a monolithic structure 123, wherein the clamp 120 surrounds the hose and has an inner surface with an adjustable diameter, wherein the tang 126 has a free end 128 embedded in the hose providing attachment of the clamp 120 to the hose, and wherein no portion of the clamp 120 and no portion of the tang 126 interferes with the sealing surface of the hose. It is noted that, in this embodiment, the clamp 120 and the tang 126 together define a monolithic structure 123 and therefore are not discrete elements which have been attached together but are created from a single piece without later attaching together the clamp and the tang. In one construction, as suggested by FIG. 8, the tang 126 is created by cutting the clamp 120 to create an appendage and by shaping the appendage into the tang 126. In one variation, this is done before embedding the free end 128 into the hose. In another variation, this is done during the embedding of the free end 128 into the hose. In another construction, as suggested by FIG. 9, the tang 226 is created by shaping a edgewise protrusion on the clamp 220. Other ways of creating the tang 126 and 226 and the clamp 120 and 220 are left to the artisan. In one example, the monolithic structure 123 consists essentially of metal.

In another expression of the second embodiment, a clamp subassembly 114 includes an annular clamp 120 and a tang 126 together defining a monolithic structure 123, wherein the clamp 120 is disposable to surround a hose having an outer surface and an opposing sealing surface, wherein the clamp 120 has an inner surface with an adjustable diameter, and wherein the tang 126 has a free end 128 which is embeddable in the hose to provide attachment of the clamp 120 to the hose with no portion of the clamp 120 and no portion the tang 126 interfering with the sealing surface of the hose. In one example, the monolithic structure 123 consists essentially of metal.

Several benefits and advantages are derived from one or more of the expressions of the disclosed embodiments and/or the method of the invention. Attaching the clamp to the hose by embedding the free end of the tang in the hose provides a mechanical attachment of the clamp to the hose which is more robust than prior art glued-on clamp-to-hose attachments. By having no portion of the clamp and no portion of the clip (or no portion of just the tang in the embodiment without the clip) interfere with the sealing surface of the hose, prior art leakage problems of a clamp or a clip contacting the sealing surface of the hose are avoided. Thus, one or more of the advantages of: improved retention between the hose and the clamp via a mechanical attachment; improved processability by reducing the variables involved (i.e., a simple production method); improved processability due to the reduced time involved in attaching the clamp to the hose; and reduced leakage problems (since the hose sealing surface is not contacted by the clamp and is not contacted by the clip) are achieved by one or more of the expressions of the disclosed embodiments and/or the method of the invention.

The foregoing description of several expressions of embodiments of the invention and of a method of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

What is claimed is:

1. A hose and clamp assembly comprising:
   a) a hose having an outer surface and an opposing sealing surface; and
   b) a clamp subassembly including an annular clamp and including a clip attached to the clamp, wherein the clamp surrounds the hose and has an inner surface with an adjustable diameter, wherein the clip includes a tang having a free end embedded in the hose providing attachment of the clamp subassembly to the hose, wherein no portion of the clamp and no portion of the clip interferes with the sealing surface of the hose, and wherein the free end of the tang is embedded in the outer surface only of the hose.

2. The hose and clamp assembly of claim 1, wherein the clip also includes an additional tang having an additional free end embedded in the outer surface only of the hose, and wherein the free end and the additional free end generally face each other.

3. The hose and clamp assembly of claim 2, wherein the free end and the additional free end are circumferentially spaced apart.

4. The hose and clamp assembly of claim 3, wherein the free end and the additional free end are crimped into the outer surface of the hose.

5. A method for attaching an annular clamp to a hose, wherein the clamp has an inner surface with an adjustable diameter, wherein the hose has an outer surface and an opposing sealing surface, and wherein the method comprises the steps of:
   a) attaching a clip to the clamp, wherein the clip includes a tang having a free end;
   b) disposing the clamp to surround the hose; and
   c) embedding the free end of the tang into the outer surface only of the hose with no portion of the clamp and no portion of the clip interfering with the sealing surface of the hose.

6. The method of claim 5, wherein step c) crimps the free end of the tang into the outer surface of the hose.

7. A hose and clamp assembly comprising:
   a) a hose having an outer surface and an opposing sealing surface; and
   b) an annular clamp and a tang together defining a monolithic structure, wherein the clamp surrounds the hose, and has an inner surface with an adjustable diameter, wherein the tang has a free end embedded in the hose providing attachment of the clamp to the hose, and wherein no portion of the clamp and no portion of the tang interferes with the sealing surface of the hose.

* * * * *